United States Patent
Andrä et al.

(10) Patent No.: US 7,849,600 B2
(45) Date of Patent: Dec. 14, 2010

(54) METHOD OF PRODUCING A VALVE ARRANGEMENT FOR AN EXPANSION VALVE

(75) Inventors: Uta Andrä, Lichtenwald (DE); Siegfried Roth, Gerlingen (DE); Albrecht Waldenburg, Stuttgart (DE); Jean-Jacques Robin, Berglen (DE); Ralf Winterstein, Dettingen/Erms (DE); Klaus Kummerow, Fellbach (DE)

(73) Assignee: Otto Egelhof GmbH & Co. KG, Regelungstechnik, Fellbach (DE)

( * ) Notice: Subject to any disclaimer, the term of this patent is extended or adjusted under 35 U.S.C. 154(b) by 1342 days.

(21) Appl. No.: 11/070,937

(22) Filed: Mar. 3, 2005

(65) Prior Publication Data

US 2005/0193562 A1    Sep. 8, 2005

(30) Foreign Application Priority Data

Mar. 3, 2004  (DE) .................. 10 2004 010 997
Aug. 20, 2004 (DE) .................. 10 2004 040 648

(51) Int. Cl.
*B21D 53/10*    (2006.01)
*B21K 1/24*     (2006.01)

(52) U.S. Cl. .................. 29/890.122; 29/890.12; 408/83.5

(58) Field of Classification Search ............ 29/890.122; 137/375, 541; 408/83.5; 62/624.6, 504, 62/525

See application file for complete search history.

(56) References Cited

U.S. PATENT DOCUMENTS

| 3,867,958 A * | 2/1975 | Turnwald ................ 137/375 |
| 5,341,656 A * | 8/1994 | Rust et al. ............... 62/324.6 |
| 6,994,108 B2 * | 2/2006 | Roth et al. .............. 137/541 |
| 7,220,086 B2 * | 5/2007 | Killinger et al. ........ 408/83.5 |

FOREIGN PATENT DOCUMENTS

JP    59047577 A    3/1984

\* cited by examiner

*Primary Examiner*—Rick K Chang
(74) *Attorney, Agent, or Firm*—Kriegsman & Kriegsman

(57) ABSTRACT

The invention relates to a method of producing a valve arrangement and to a valve arrangement for an expansion valve, which is provided in a vehicle air conditioning system operated with refrigerant and has a basic opening in the valve seat, the cross section of this basic opening being produced for a predetermined mass flow by material removal.

17 Claims, 5 Drawing Sheets

METHOD OF PRODUCING A VALVE ARRANGEMENT FOR AN EXPANSION VALVE

BACKGROUND OF THE INVENTION

1. Field of the Invention

The invention relates to a method of producing a valve arrangement, in particular for an expansion valve, and to a valve arrangement which is provided, for example, in a vehicle air conditioning system operated with refrigerant.

2. Description of Related Art

EP 1 052 463 A1 has disclosed an expansion valve which accommodates a regulating valve in a housing, and this regulating valve opens and closes the expansion valve as a function of an evaporation pressure and a temperature in a second refrigerant passage via an actuating device designed as a thermohead. Flange-mounted as displacement-generating device on the outside of the housing, separately from the regulating valve, is a solenoid valve which activates a valve arranged outside the housing and opens and closes a first passage opening. The valve is supplied by a passage which leads into a feed opening of a valve space. Leading from this valve space is a bypass bore which runs parallel to the valve seat and opens into a further opening, in which the solenoid valve is provided, which opens and closes the bypass opening.

Such bypass bores which are provided parallel to the passage opening of a valve arrangement have the disadvantage that there is the risk of the bypass bore being reduced in diameter or of the bypass bore of small diameter being obstructed by dirt particles.

Furthermore, valve arrangements for an expansion valve have been disclosed in which one or more recesses are made in the valve seat by non-cutting shaping in order to permit a throughflow of refrigerant with a valve arrangement in closed position. These valve seats have the disadvantage that beads are formed by the material deformation or shaping on account of the displacement of the material in the marginal region of the recess, as a result of which the valve-closing member in a closed position does not come fully to bear in the valve seat. In addition, exact production of the recess for forming a basic opening or a bypass is not made possible. Consequently, reproducibility during the production of such valve arrangements to be accurately adjusted is not possible.

BRIEF SUMMARY OF THE INVENTION

The object of the invention is therefore to provide a method of producing a valve arrangement, in particular for an expansion valve, and a valve arrangement, which makes possible an exact and reproducible configuration of a valve arrangement having a basic opening or a bypass opening in the valve seat.

This object is achieved according to the invention by a method of producing a valve arrangement in which at least one recess or prominence is made as basic opening at least on the valve seat or on the valve-closing member by material removal. By the removal of material at least on the valve seat or valve-closing member, exact production of the at least one recess or prominence is achieved. The marginal regions or transition regions of the at least one recess or prominence relative to the valve seat or to the valve-closing member retain their geometries matched exactly to one another. Furthermore, high reproducibility is achieved by the material removal. In addition, the making of at least one prominence or recess as basic opening at least on the valve seat or valve-closing member has the advantage that clogging or obstruction of the same is prevented. When the valve arrangement is opened, a high mass flow flows through the passage opening of the valve arrangement, as a result of which the at least one recess or prominence on the valve seat or valve-closing member is flushed out and cleaned.

According to an advantageous configuration of the method, provision is made for the at least one recess or prominence to be produced as a basic opening using at least one cutting tool, in particular a milling tool. The machining permits a high dimensional accuracy of the basic opening at least as a recess or prominence. At the same time, the flexibility in the shape and form of prominences or recesses on the valve seat or valve-closing member is increased by the use of a cutting tool.

By the selection and geometry of the cutting tools, the depth, the size and also the profile of the prominence or recess for producing a basic opening of the valve arrangement can advantageously be adapted to the respective requirements in a flexible manner. At least one runout of the recess or prominence can be created with a defined transition by means of a corner radius on the milling tool.

The removal of material for producing at least one recess or one prominence as basic opening in a valve arrangement may alternatively be effected by plunge electrical discharge machining using an electrode. In such an alternative embodiment for removing material, the adjacent regions remain in their initial state. Exact and complicated geometries can be incorporated.

Furthermore, an alternative configuration of the method provides for the material removal to be carried out by a scraping or broaching tool. This likewise makes possible exact machining without impairing the adjacent regions of the valve seat.

According to a further alternative configuration of the method, provision is made for the material removal to be effected by high-energy radiation, in particular by laser radiation. The width and depth or height of the recesses or prominences of the basic opening can be set by setting process parameters, such as output and focussing diameter for example.

The tool for removing material for producing the recess is advantageously guided by a path control along a machining path for removing material at least on the valve seat or on the valve-closing member. As a result, the recess or prominence can be produced by the surface to be machined on the valve seat being traversed once or several times by the tool. This makes it possible to produce the recess or prominence, for example, using a tool, in particular a milling tool, which is smaller in diameter than the recess width to be produced. By means of this control, a variable geometry of a basic area of the recess can be achieved, and this basic area may be designed without steps or may be of stepped or curved design or may be designed with different slopes or the like. The abovementioned advantageous configurations of the method also apply in an analogous manner to the production of the at least one prominence on the valve seat or valve-closing member.

To produce a basic opening, provision is made according to an alternative embodiment of the invention for a tool for making a recess to be guided by an infeed movement rectilinearly along an infeed direction, the rotation axis of the tool being held in a position outside the valve seat or valve-closing member. This makes it possible to achieve exact and burr-free machining of the recess. In addition, only small forces act on the milling cutter as a result, thereby increasing the dimensional accuracy during the machining of the valve seat for making the recess.

Provision is preferably made for a valve housing, a valve seat and at least one prominence or recess as basic opening on the valve seat to be produced from a monolithic block. This leads to cost-effective production, since complete machining is made possible with only one set-up of the block. At the same time, high dimensional accuracy is provided for, as a result of which the quality of the expansion valve is increased.

According to a further advantageous configuration of the method, provision is made for the valve seat or the valve-closing member to be treated by chemical material removal, in particular by pickling, after the at least one recess or prominence has been made. As a result, sharp transition regions are rounded. This leads to an improved flow.

Furthermore, provision is advantageously made for the at least one prominence or recess as basic opening in the valve arrangement to be anodized. The edges in the transition region of the prominences or recesses on the valve seat or valve-closing member are therefore additionally rounded off, since the highest voltage is applied at sharp transitions during the anodizing and leads to rounding.

According to a further alternative configuration of the method, provision is made for the basic opening provided at least on the valve seat or on the valve-closing member to be produced by chemical material removal. The chemical material removal can be made possible by etching or the like. The regions not intended for the material removal are advantageously covered with a mask in order to achieve the desired shape of the basic opening. Depending on the concentration of the removal agent, the duration of action and the materials used for the valve arrangement, the geometry of the basic opening in the form of a recess can be achieved.

According to a further advantageous and alternative configuration of the method, provision is made for at least the closing surface of the valve seat or of the valve-closing member to be treated by chemical material removal, at least in regions, by the closing surface being roughened. Due to the surface roughness on the closing surface of the valve seat and/or of the valve-closing member, a mass flow can flow through between a refrigerant inlet opening and a refrigerant outlet opening on account of the valve arrangement not completely closing the passage opening. The higher the surface roughness, the greater the mass flow flowing through the valve arrangement in a closed position. According to an exemplary embodiment, the valve seat can be roughened and the surface of the valve-closing member can be very smooth. The relationships may also be transposed. In addition, provision may be made for regions on the valve seat and/or on the valve-closing member to be roughened, at least in sections, and these regions may be provided opposite one another and/or so as to alternate with one another.

According to an alternative configuration of the invention, the basic opening in a valve arrangement of an expansion valve can be produced by grinding at least on the valve seat or valve-closing member. This achieves a surface roughness which again is formed at least in sections on the valve seat or valve-closing member and enables a basic mass flow to flow through. The grinding may be provided as an additional machining operation, for example after the production of the valve seat, the previous operation being provided with a machining allowance, so that the grinding is provided as the last machining step for example. At least the one prominence or recess as basic opening may also be formed by the grinding.

The grinding is preferably carried out with a grinding tool. The surface roughness can be selected and the volume of the mass flow determined by the selection of the grain size. For example, in a valve arrangement with a ball valve as valve-closing member, the ball can be provided with a surface roughness which comes to bear in a valve seat machined to size. This provides for cost-effective production of a valve arrangement, for example by the valve-closing members being provided with surface roughness by barrel finishing as barrel-plated parts.

Furthermore, the object is achieved by a valve arrangement according to the invention, in which at least the valve seat or the valve-closing member has at least one recess or prominence, formed by material removal, as basic opening in a closed position of the valve-closing member relative to the valve seat. This basic opening is part of a passage opening of the valve arrangement, in which case the cross section of the at least one recess or prominence can be adapted to a predetermined mass flow. The forming of the prominence or recess as basic opening by material removal permits tool-related production, which does not depend on the machine tolerances. As a result, high repetitive accuracy is achieved. At the same time, the roundness of the valve seat and the accuracy to shape of the valve seat are retained. As a result, the mass flow can be set within a very narrow tolerance range.

The at least one prominence or recess as basic opening on the valve seat or valve-closing member advantageously has an identical minimum length in front of and behind the bearing point of the valve-closing member in the valve seat. As a result, a throttling effect is prevented. This also makes it possible for the volume to remain constant over the travel of the valve-closing member.

To increase the longevity of a valve arrangement, provision is made for the at least one recess in the valve seat or valve-closing member to have a width which is designed to be equal to or less than the depth.

This makes possible exact bearing in a closed position without deformation even when a high pressure caused by the valve-closing member acts on the valve seat. The valve-closing member is usually designed as a steel ball and the valve seat is usually made of a brass or aluminium alloy. Due to the narrow or deep configuration of the recess, sagging of the marginal regions of the basic opening is countered.

According to an alternative configuration of the invention, in order to increase the longevity of a valve arrangement, provision is made for the at least one prominence as basic opening on the valve seat or valve-closing member to have a width which is designed to be equal to or greater than the height of the prominence. As a result, reliable bearing without deformation of the marginal regions of the prominence can be achieved, as a result of which the dimensional accuracy for the mass flow flowing through the basic opening is maintained.

BRIEF DESCRIPTION OF THE DRAWINGS

The invention and further advantageous embodiments and developments of the same are described in more detail below with reference to the examples shown in the drawings. The features to be gathered from the description and the drawings may be applied in accordance with the invention individually on their own or in any desired combination. In the drawing.

DETAILED DESCRIPTION OF THE INVENTION

Figure 1:
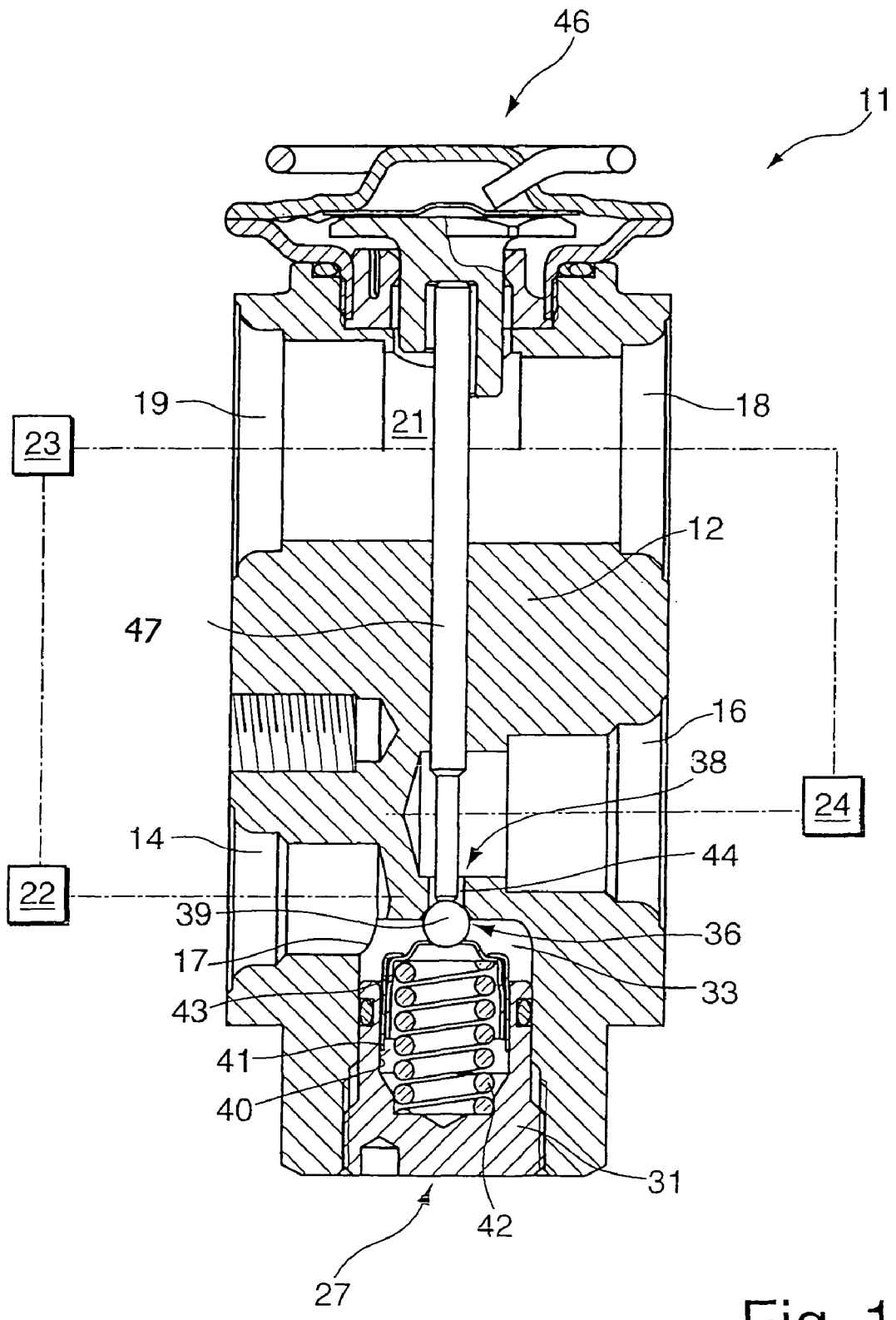
FIG. 1 shows a schematic sectional illustration of an expansion valve with a valve arrangement according to the invention.

An expansion valve 11 is shown by way of example in FIG. 1. It comprises a housing 12 with a first coolant inlet opening 14, a first coolant outlet opening 16 and a coolant passage 17 connecting the first coolant inlet opening 14 and the first coolant outlet opening 16. Furthermore, a second coolant inlet opening 18 and a second coolant outlet opening 19, which are connected to one another by a second coolant passage 21, are provided in the housing 12. Connected to the first coolant inlet opening 14 is the outlet side of a condenser 22, the inlet side of which is connected to the outlet side of a compressor 23. The inlet side of the compressor 23 is connected to an outlet side of an evaporator 24.

The housing 12 of the expansion valve 11 has a housing section 26 which extends into the housing interior and into a part of the refrigerant passage 17. A regulating device 27 can be inserted into the housing section 26. According to the exemplary embodiment, the regulating device 27 is advantageously completely integrated in the housing 12 in order to reduce the construction space. In addition, the regulating device 27 can be actuated by a displacement-generating device and a shut-off valve.

The regulating device 27 comprises a regulating screw 31, which preferably acts on the housing section 26 via a thread. Provided in a regulating space 33 is a valve arrangement 36 which comprises a valve seat 37 arranged on the housing 12. In the valve seat 37, a valve-closing member 39 is located in a closed position 38. The valve-closing member 39 is designed as a ball valve. The valve-closing member 39 comprises, inter alia, a damping element 41, which has damping lugs 43 acting in a bore section 40 and is connected to a regulating spring 42 arranged in the bore section 40. In the closed position 38, the valve-closing member 39 closes a passage opening 44 which is provided between the first coolant inlet opening 14 and the first coolant outlet opening 16.

An actuating device 46 designed as a thermohead is provided for actuating the valve-closing member 39, this actuating device 46 acting on the valve-closing member 39 via a transmission pin 47 and opening and closing the valve arrangement 36. The use of a thermohead as actuating device 46 according to FIG. 1 is only exemplary and is not absolutely necessary for every type of expansion valve.

Figure 2A:
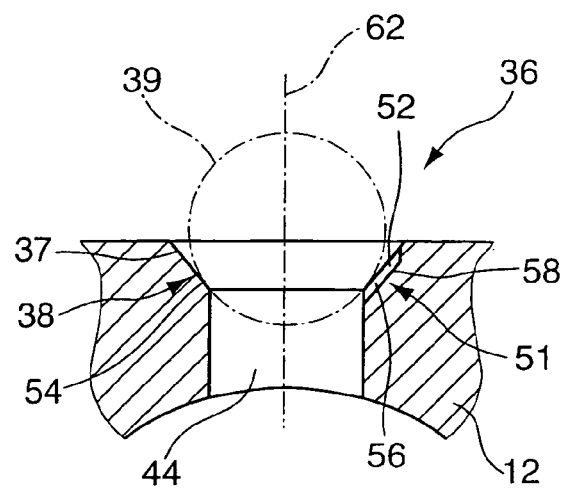
FIGS. 2a-c show an enlarged illustration of an embodiment according to the invention of the valve arrangement in FIG. 1, FIGS. 3a-c show an enlarged illustration of a further embodiment according to the invention of the valve arrangement in FIG. 1.
Figure 2B:
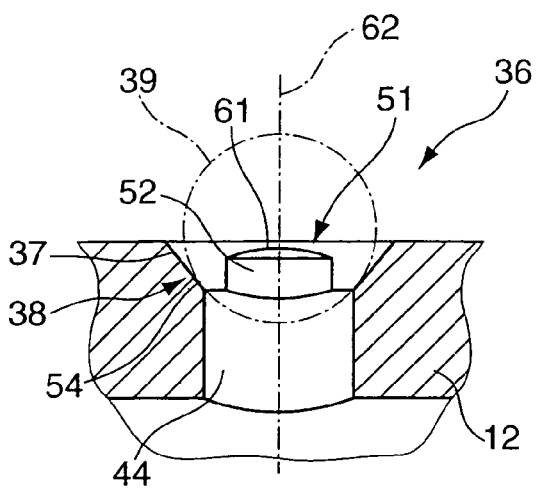
Figure 2C:
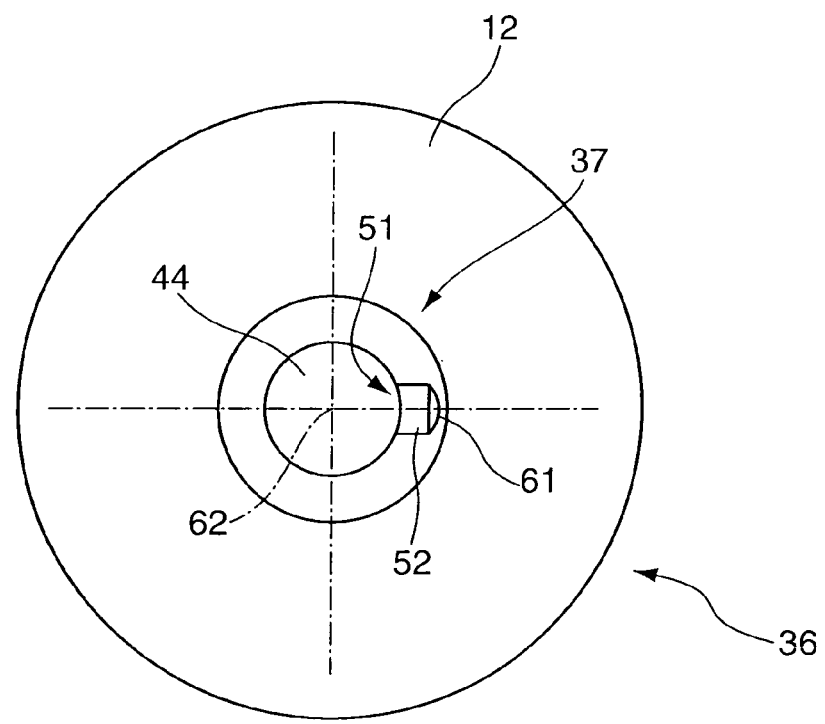

A first embodiment of the valve arrangement 36 according to the invention is shown in a schematically enlarged illustration in FIGS. 2a to c. The valve arrangement 36 has a recess 52 as a bypass opening or basic opening 51 in the valve seat 37. One recess 52 is shown in the valve seat 37 by way of example. A plurality of recesses 52 distributed evenly or unevenly over the circumference may likewise be provided in the valve seat 37 and/or valve-closing member 39. The valve-closing member 39 is arranged in a closed position 38 and is shown by a broken line. The cross section 56, acting at the bearing point 54, of the recess 52 in the valve seat 37 determines the mass flow or the specific output in litres per hour of the refrigerant, which in a closed valve arrangement 36 passes through the basic opening 51 from the regulating space 33 and reaches the evaporator. As a result, a mass flow of refrigerant circulates through the air conditioning system described with reference to FIG. 1, thereby providing for lubrication of the components 22, 23, 24 in the cycle of an air conditioning system on account of the emulsions entrained in the refrigerant.

The basic opening 51 extends from the passage opening 44 along the conical valve seat 37. The angle of inclination of the base 58 of the recess 52 preferably corresponds to the angle of inclination of the conical valve seat 37. The arrangement of the basic opening 51 shown provides for a constant volumetric flow, which flows through the closed valve arrangement 36 without a throttling effect.

The basic opening 51 shown in FIGS. 2a to c can be made, for example, in one operation by material removal by means of a cutting tool designed as a milling head. The milling head preferably has a radius which corresponds to the radius 61 of the basic opening 51 made and is moved eccentrically to the longitudinal centre axis 62 towards the conical surface of the valve seat 37. The milling head has conical cutting edges advantageously running towards the end face, so that a basic opening 51 is made by an infeed movement along the longitudinal centre axis 62 or at right angles to the longitudinal centre axis 62. The neighbouring regions or the adjacent surfaces of the valve seat 37 are not affected by the use of the cutting tool. In addition, the basic opening 51 can be dimensioned exactly. The mass flow flowing through the basic opening can be set to a tolerance of less than +/−20% of the predetermined mass flow. The larger the mass flow flowing through the basic opening 51, the smaller the tolerance range becomes. Accuracies right into the μm range can be achieved by the machining according to the invention. Alternatively, such a recess can also be produced by a path-controlled material-removal process in which a tool is used whose radius is smaller than the recess 52. Such exact machining specifications cannot be made possible by non-cutting shaping of the valve seat surface.

Figure 3A:
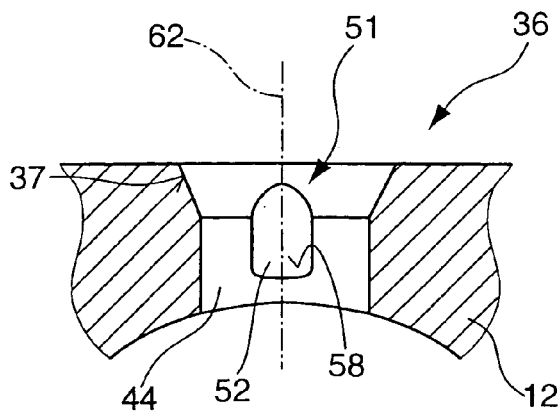
Figure 3B:
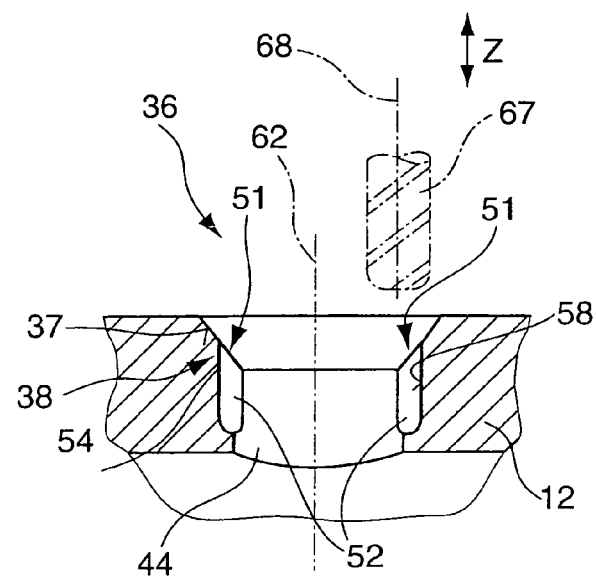
Figure 3C:
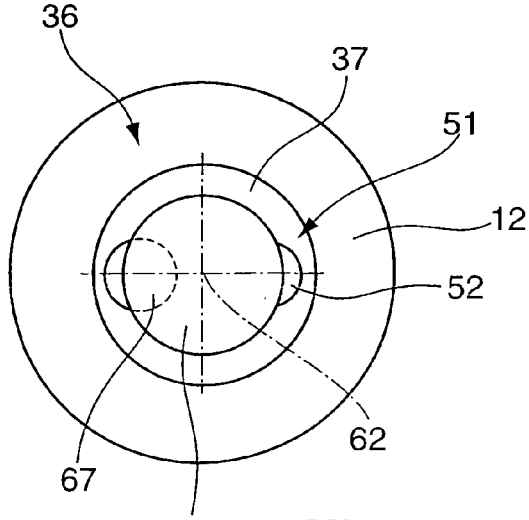

Shown schematically in FIGS. 3a to c is a basic opening 51 in an alternative configuration to FIGS. 2a to c.

This basic opening is produced by milling. A milling tool 67 is positioned, for example, above the valve seat 37 and is fed into the valve seat 37 by an infeed movement solely along the Z axis according to arrow z. The tool 67 is advantageously fed in such a way that its rotation axis 68 is positioned outside the surface of the valve seat 37, thus providing for slight engagement of the tool 67 for material removal on the valve seat 37 and possibly on the bore wall of the passage opening 44. The tool 67 advantageously has rounded cutting edges at its end face, thereby making possible a rounded runout of the recess 52 into the bore wall of the passage opening 44 in accordance with the geometry of the cutting edge.

For example, two recesses which are arranged opposite one another are shown in FIGS. 3b and 3c. Alternatively, a plurality of recesses 52 advantageously located symmetrically opposite one another or arranged in a symmetrically distributed manner over the circumference may also be provided in order to form the basic opening 51. The arrangement of a plurality of recesses 52 for forming a basic opening 51 has the advantage that a uniform application of force on the valve-closing member 39 is provided for on account of the mass flow flowing through, as a result of which the valve-closing member 39 is in turn guided coaxially to the passage opening 44 in order to pass evenly into a closed position for bearing in the valve seat 37. As a result, the longevity can be increased.

The material-removal process permits tool-related production, which can be carried out in a very precise and reproducible manner. In addition, both the burr formation and the material displacement, as in the case of non-cutting shaping for example, are avoided. Furthermore, very diverse geometries of the recesses 52 for forming the basic opening 51 can be created by the selection of corresponding tools 67.

Figure 4A:
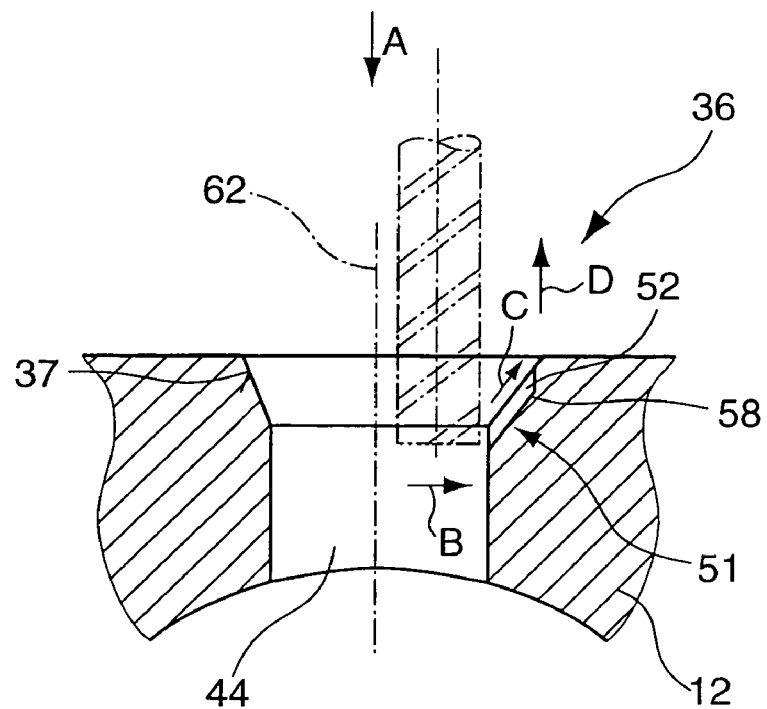
FIG. 4a shows a schematic illustration of a machining operation for producing a basic opening in an expansion valve according to FIG. 1.

A machining operation for making a recess 52 in a valve seat 37 by a cutting tool 67 is shown in FIG. 4a. This tool is guided via a path control in order to incorporate the predetermined geometry of the recess 52 in the valve seat 37. For example, first of all an infeed movement of the tool 67 is effected according to arrow A. This may be followed by a direction of movement according to arrow B in order to start the machining at a section of the recess 52 which leads into the passage opening 44. To form a base 58 of the recess 52, this base running, for example, parallel to the surface of the valve seat 37, the tool 67 is guided in arrow direction C. At the end of this travel, the tool 67 is lifted perpendicularly upwards according to arrow direction D, as a result of which a runout of the valve seat 37 is formed. This machining sequence may also be repeated several times in order to carry out, for example, a machining operation using a tool 67 which has a smaller diameter than the recess 52. The individual machining steps may also be effected in the reverse sequence. Depending on the amount of material to be removed during a machining step, gradual material removal may also be effected, so that only a slight infeed for the removal of material is necessary during each operation.

Figure 4B:
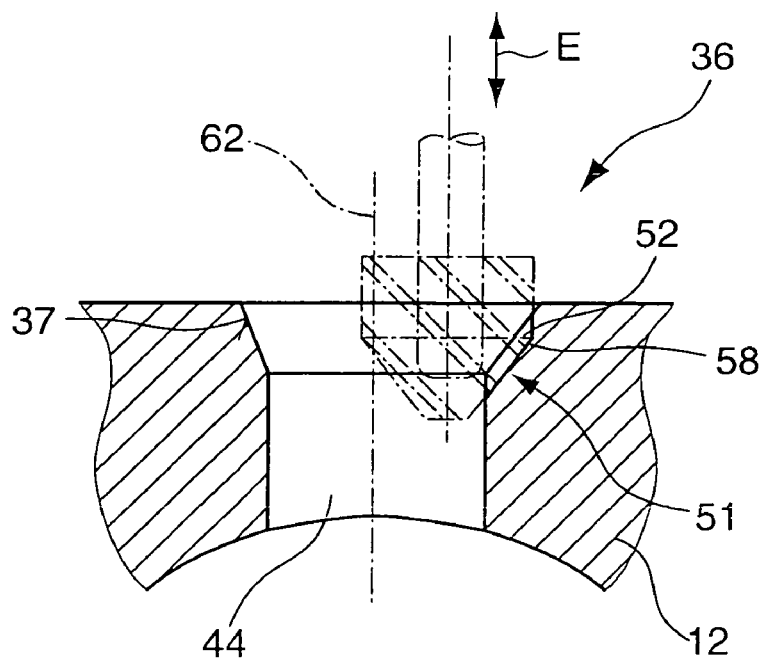
FIG. 4b shows a schematic illustration of an alternative machining operation for making a basic opening in an expansion valve according to FIG. 1.

An alternative embodiment for producing a recess 52 is shown in FIG. 4b. In the case of a conical tool 67 for example, the geometry of the recess according to FIG. 4a can be produced by a machining operation by the tool being guided rectilinearly along an infeed direction. This infeed direction may correspond to a Z axis according to arrow E. Likewise, this may be effected by a spatial direction provided at right angles thereto. In addition, a diagonal infeed may also be effected in order to produce the recess 52.

The path control can be programmed in and configured as a function of the geometry of the cutting edges of the tool 67.

Exact geometries for the basic opening 51 and thus exact mass flows can be set by the abovementioned machining steps. At the same time, the use of the tools enables the basic opening 51 to be produced with variable geometry.

The material removal according to the invention in a valve seat and/or a valve-closing member of a valve arrangement may alternatively be effected by chemical material removal and/or by grinding. Furthermore, a combination of machining, grinding and/or chemical material removal may also be provided for.

Figure 5A:
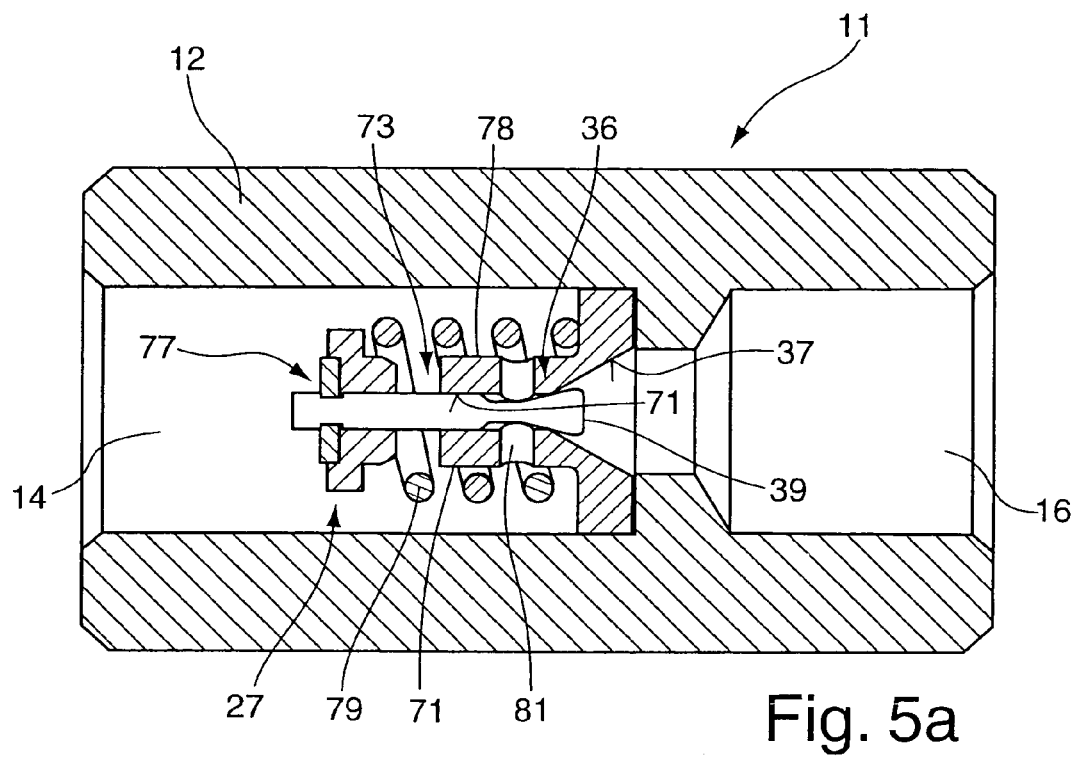
FIG. 5a shows a schematic sectional illustration of an expansion valve in an alternative embodiment to FIG. 1.
Figures 5B, 5C:
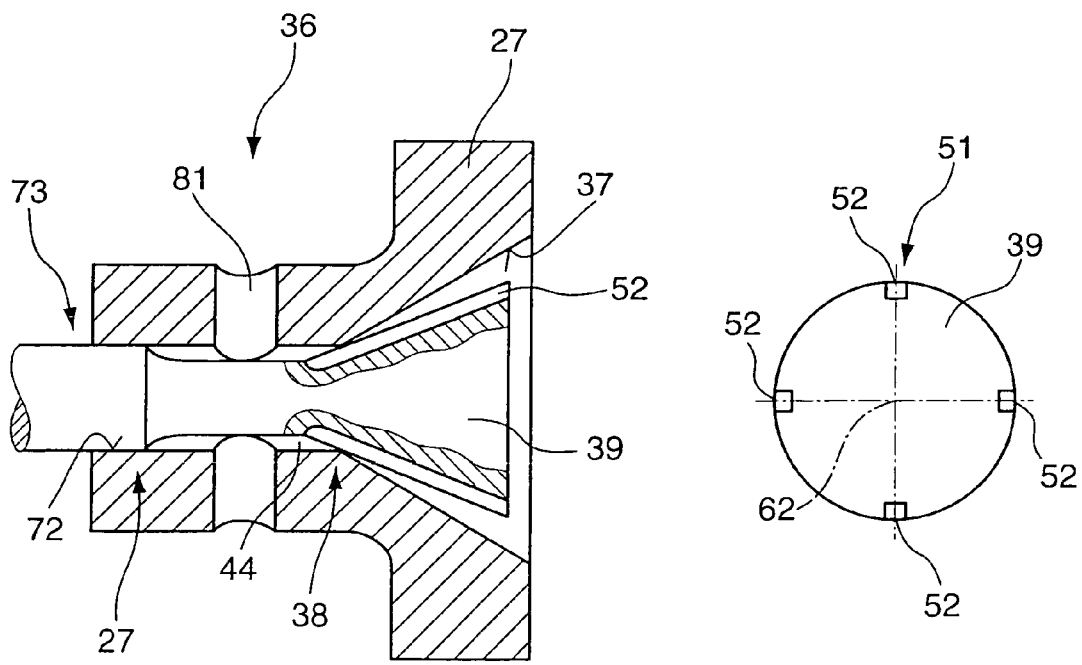
FIG. 5b shows an enlarged sectional illustration of a valve arrangement of the expansion valve according to FIG. 5a, and FIG. 5c shows a schematic side view of a valve-closing member according to FIG. 5b.

An alternative embodiment of an expansion valve 11 is shown in FIG. 5a. FIGS. 5b and c show a schematically enlarged illustration of an alternative valve arrangement 36 of the expansion valve 11 according to FIG. 5a. In a valve housing 12, the expansion valve 11 has a coolant inlet opening 14 and a coolant outlet opening 16, which are connected to one another via a passage opening 44. Provided in the coolant inlet 14 is a regulating device 27. The latter may be pressed, adhesively bonded or screwed in place or be fastened by further aids, such as by a screwed or clamped connection. The regulating device 27 comprises a valve seat 37, assigned to which is a valve-closing member 39. The valve-closing member 39 is guided by a guide section 71 in a section 72 of the regulating device 27. Adjoining the end of the guide section 71 is a retaining section 73 for accommodating a setting device 77. A restoring device 79 is arranged between the setting device 77 and the valve seat 37 or a housing section 78 of the regulating device 27. The setting device 77 enables the restoring force, which is preferably achieved by a compression spring, to be set.

Between the valve seat 37 and the guide section 71, the regulating device 27 has transverse bores 81 which are connected to the passage opening 44. In the transition region between the transverse bores 81 and the valve seat 37, the valve-closing member 39 is designed to be tapered relative to the guided section 71, so that the refrigerant passes to the passage opening 44.

The valve-closing member 39 has a conical closing body which closes with a valve seat 37 in an annular manner. The shape of the valve-closing member 39 shown in FIG. 5a permits self-centring positioning of the valve-closing member 39 relative to the valve seat 37.

According to FIG. 5c, the valve-closing member 39 has at least one recess 52 for forming a basic opening 51. As a result, a predetermined mass flow of the refrigerant flows through the regulating device 27. According to this exemplary embodiment, in FIGS. 5b and 5c, square or rectangular grooves are made in the valve-closing member 39. Alternatively, semicircular recesses, elliptical recesses or further polygonal recesses may also be made. The number and geometry of the recesses 52 are to be matched to the respective intended use and the required mass flow.

In FIGS. 5b and c, the recesses may likewise be provided in the valve seat 37, the valve-closing member 39 then having a conical lateral surface without recesses.

Alternatively, provision may also be made for both the valve seat 37 and the valve-closing member 39 to contain recesses, so that the requisite mass flow flows through the valve arrangement 36.

The above-described exemplary embodiments for forming basic openings 51 in the form of recesses similarly apply to prominences. In this case, it is always necessary to take an overall view with regard to the setting of the mass flow, the volume of the mass flow being permitted by prominences and/or recesses as basic openings in the valve seat 37 or in the valve-closing member 39 or in the valve seat 37 and the valve-closing member 39. If a plurality of basic openings 51 are necessary, they may also differ from one another in their geometry and the prominences and recesses may be combined in any desired manner.

We claim:

1. Method of producing a valve arrangement for an expansion valve, said valve arrangement being provided in a housing with a regulating space and comprising a conical valve seat; which is closed by a valve-closing member located in closed position and closing a passage opening which is provided between a first coolant inlet opening and a first coolant outlet opening of the housing, said valve arrangement further comprising a basic opening which connects the first coolant inlet opening and the first coolant outlet opening of the housing for a constant volumetric flow when the valve arrangement is closed, wherein the basic opening in the valve seat is provided by material removal and the basic opening is produced to extend from the conical valve seat to the passage opening.

2. Method according to claim 1, wherein the basic opening comprises at least one recess produced using at least one cutting tool.

3. Method according to claim 2, wherein the cutting tool has a corner radius.

4. Method according to claim 2, wherein the cutting tool has a geometry of a cutting head which corresponds to the basic opening.

5. The method as claimed in claim 2 wherein the cutting tool is a milling tool.

6. Method according to claim 1, wherein the basic opening is produced using an electrode for plunge electrical discharge machining.

7. Method according to claim 1, wherein a scraping or broaching tool is used for the material removal.

8. Method according to claim 1, wherein the material removal is carried out by means of high electromagnetic radiation, in particular laser radiation.

9. Method according to claim 1, wherein the basic opening comprises at least one recess and wherein a tool for forming the at least one recess is guided by a path control along a machining path for removing material.

10. Method according to claim 1, wherein the basic opening comprises a recess and wherein a tool for forming the recess is guided by an infeed movement rectilinearly along an infeed direction, the rotation axis of the tool being held in a position outside the valve seat or valve-closing member.

11. Method according to claim 1, wherein the basic opening comprises at least one recess on the valve seat and wherein the housing of the expansion valve, the valve seat and the at least one recess on the valve seat are produced from a monolithic block.

12. Method according to claim 1, characterized in that the valve seat or the valve-closing member is treated by chemical material removal, in particular by pickling, after the at least one recess as basic the opening has been made.

13. Method according to claim 1, wherein the basic opening comprises at least one recess and wherein the at least one recess is anodized.

14. Method according to claim 1, wherein the basic opening provided at least on the valve seat or on the valve-closing member is produced by chemical material removal.

15. Method according to claim 1, wherein at least the closing surface on the valve seat or of the valve-closing member is roughened by chemical material removal, at least in regions, and forms the basic opening.

16. Method according to claim 1, wherein at least the valve seat or the valve-closing member is produced by grinding, and the basic opening is formed by a surface roughness which is provided at least in regions on the valve seat or valve-closing member.

17. Method according to claim 16, wherein the constant volumetric flow for the basic opening is limited by a surface roughness at least on the valve seat or the valve-closing member.

* * * * *